Dec. 18, 1951  C. R. FAIREY  2,579,311
WIND-DRIVEN POWER GENERATOR
Filed July 7, 1949  2 SHEETS—SHEET 1

CHARLES RICHARD FAIREY,
Inventor
By Robert B Pearson
Attorney

Dec. 18, 1951   C. R. FAIREY   2,579,311
WIND-DRIVEN POWER GENERATOR
Filed July 7, 1949

CHARLES RICHARD FAIREY,
Inventor

By Robert B Pearson
Attorney

Patented Dec. 18, 1951

2,579,311

UNITED STATES PATENT OFFICE 2,579,311

WIND-DRIVEN POWER GENERATOR

Charles Richard Fairey, Hayes, England

Application July 7, 1949, Serial No. 103,480
In Great Britain March 5, 1948

2 Claims. (Cl. 290—2)

This invention relates to wind-driven power generators. The use of windmills for electrical power generation is well-known, but the main drawback of the wind power plant is that its output is intermittent, due to the variations in the wind. This may be overcome by the use of an electrical generator and storage batteries, but this increases the capital cost, especially in the case of small plants, and introduces other troubles.

The characteristic of an electrical generator is that the electro-motive force is a function of the speed, and although the E. M. F. may, by various means, be made substantially uniform over a working range of wind speed depending upon the type of wind mill used and upon local conditions, the average velocity of wind on most sites is made up of long periods of low velocity and comparatively short periods of higher velocity. Furthermore, the generation of alternating current necessitates the exact "phasing in" of all generators connected in a common circuit. The speed control for a large installation, therefore, has to be exact, and does not admit of anything more than minute variations in speed.

To overcome these difficulties, it is proposed to use wind power to produce heat by means of an electric generator, since heat can be generated at the lowest wind velocity regardless of E. M. F. or periodicity.

An object of the present invention is to provide a wind-driven heat-producing plant that is virtually independent of the characteristics of the electric generator and is operable over a relatively wide speed range.

Another object of the invention is to enable a wind-driven heat-producing plant to be operated in conjunction with a fuel-burning plant of normal type, so that advantage may be taken of suitable wind conditions during operation of the fuel-burning plant to reduce the amount of fuel required to maintain a given output.

In this way the capital cost of the installation may be minimized, e. g. by the employment of a fixed pitch propeller driving the simplest form of electric generator such as a single phase alternator with a minimum of gearing.

According to the invention a wind-driven power generating plant comprises an electric generator driven by a wind mill and arranged to operate a heating component associated with a heat storage component.

The heating component may be constituted by a series of immersion heaters located in a steam boiler constituting the heat storage component, the immersion heaters being arranged to be brought into or out of operation in accordance with rise or fall respectively of the electric generator output. A plurality of relays are arranged to bring the immersion heaters into and out of operation. The operation of the relays may be controlled by a centrifugal switch actuated by the wind mill.

There may be provided at least two boilers, each having a series of immersion heaters located therein, the first boiler having a pressure-operated changeover switch arranged to bring the second boiler into use only when the maximum heat capacity of the first boiler has been reached.

Embodiments of the invention will be described with reference to the accompanying drawings, in which.

Figure 1:
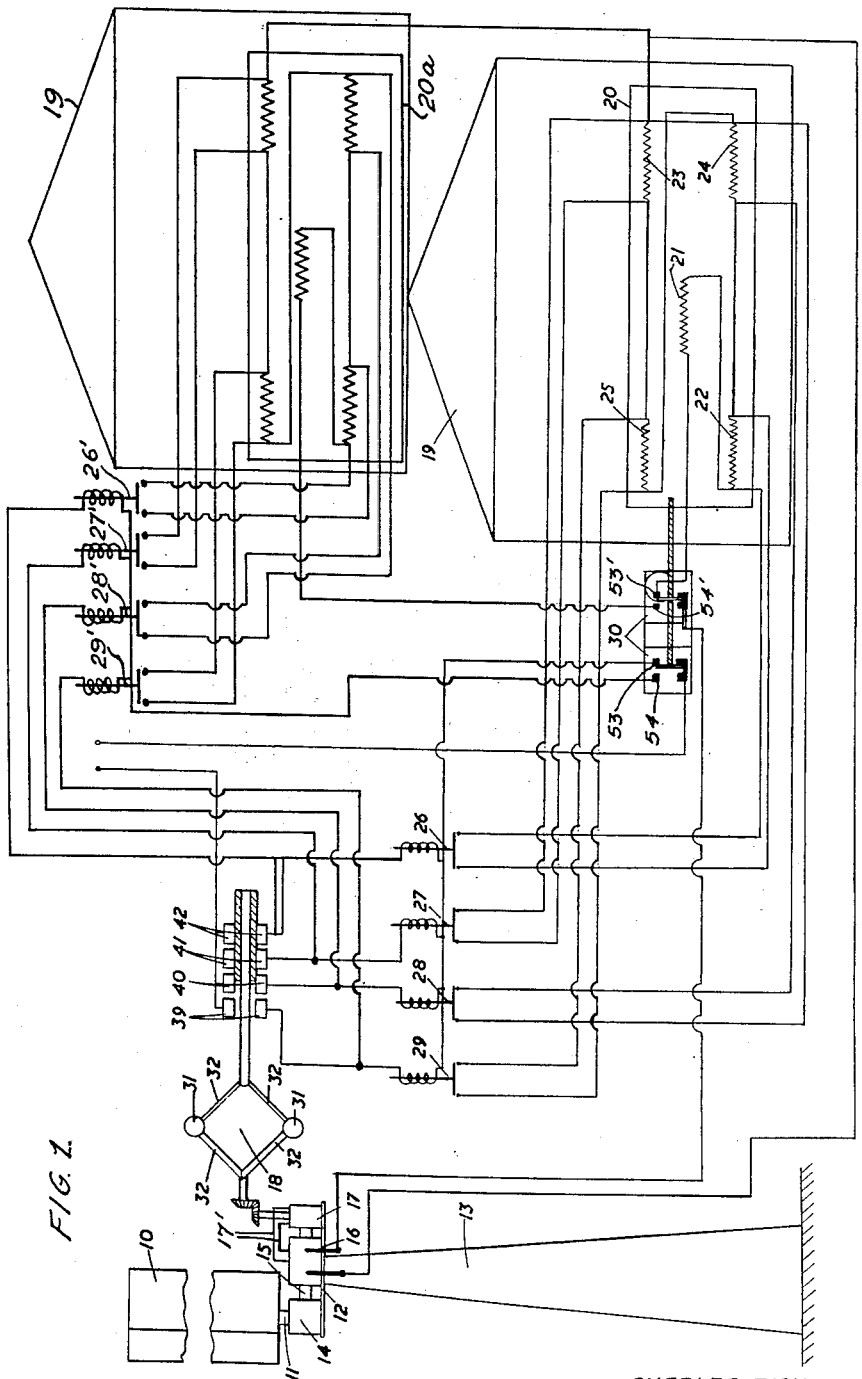
Figure 1 is a diagrammatic representation of an installation.
Figure 2:
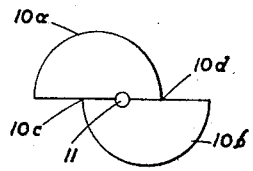
Figure 2 is a fragmentary diagrammatic plan view of a wind mill.
Figure 4:
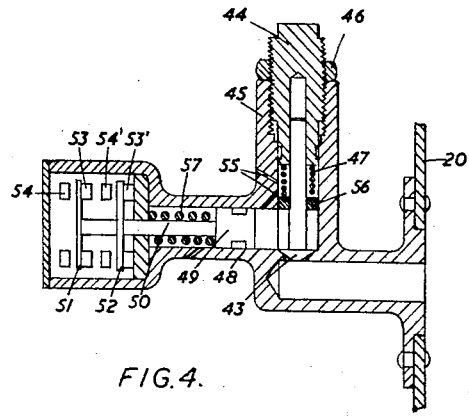
Figure 4 is a sectional elevation of a steam pressure switch.
Figure 3:
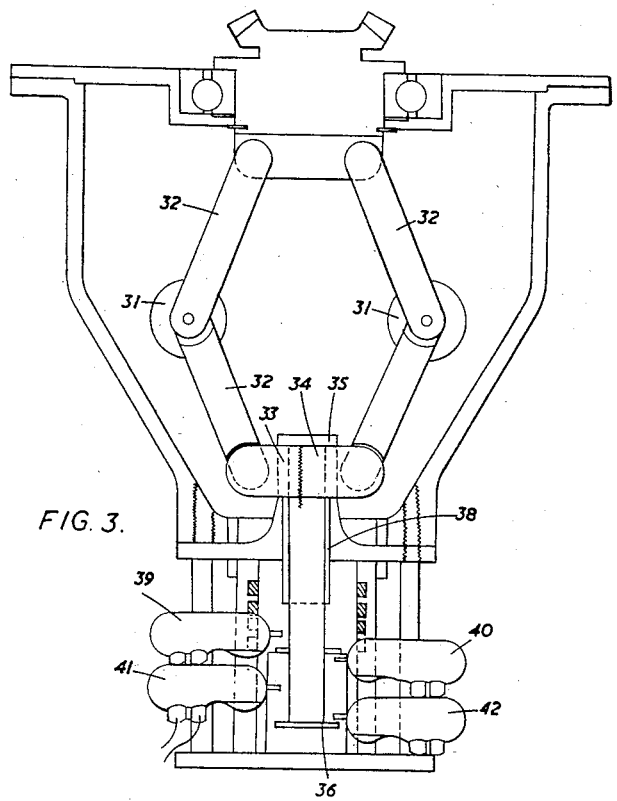
Figure 3 is a diagrammatic side elevation of a centrifugal switch.

Referring to the drawings, a windmill 10 is rotatably mounted on a vertical shaft 11 carried on a platform 12 on the top of a pylon 13. The windmill 10 has two vanes 10a, 10b of a semi-cylindrical shape, the axis 10c or 10d of each vane being vertical and parallel with the axis of the shaft 11 about which the vanes rotate, and the vane axes being so displaced, symmetrically and relatively to the axis of rotation, as to cause a passage of suitable width to be formed between the inner edges, which are coincident with the axis 10c, 10d of the vanes. Such a windmill is independent of the direction of the wind, and rotates in a given direction (according to the original setting of the vanes) under all wind conditions. The vertical windmill shaft 11 is coupled to a gearbox 14 the output shaft 15 of which is suitably stepped up to drive an alternator 16 and exciter 17. The output of the exciter 17 is connected by conductors 17' with the field winding of the generator 16. Also driven from the gearbox 14 is a centrifugal switch 18 arranged to operate relays as will be described below.

In a separate power house 19 are two boilers, one being indicated at 20 and the other at 20a, each provided with five immersion heaters 21, 22, 23, 24, 25 connected in series with one another and with the electric generator 16, and the second and subsequent immersion heaters in the boiler 20 having in parallel therewith solenoid-operated switches 26, 27, 28, 29 constituting relays controlling their associated heaters and themselves controlled by the centrifugal switch 18.

A similar group of switches 26', 27', 28', 29', also controlled by the centrifugal switch, is provided for the boiler 20a.

In addition, the boiler 20 has a changeover switch 30 operated by steam pressure to enable the second boiler 20a to be brought into operation.

The centrifugal switch 18 has a pair of weights 31 mounted on pivoted arms 32 in known manner and arranged to cause a vertical sleeve 33 to rise or fall according to the speed of rotation of the weights. Within the vertical sleeve 33 is a spindle 34 formed with flanges 35, 36 at its upper and lower ends respectively, and held against rotation by a key 38, but capable of being raised by the sleeve 33 abutting against its upper flange 35. Located around the lower flange 36 are four tiltable mercury switches 39, 40, 41, 42 arranged at different levels so that each switch is engaged and tilted by the upward movement of the flange 36 when a predetermined speed of rotation, appropriate to that switch, has been attained by the centrifugal switch 18. The flange 36 returns the mercury switches 39, 40, 41, 42 to their open positions as it descends while the rotational speed of the governor decreases. Each of the mercury switches 39, 40, 41, 42 controls the solenoid of the respective relays 29, 28, 27, 26 or the relays 29', 28', 27', 26', whichever group thereof is in circuit.

The steam-operated changeover switch 30 comprises a spring-loaded poppet valve 43 exposed to the pressure in the boiler 20 and capable of being regulated by a regulator 44 which may be screwed upwardly or downwardly relatively to the body 45 of the valve and locked by a nut 46, so controlling the spring 47 of the valve that it opens at a predetermined pressure. The valve 43 admits steam to a cylindrical chamber 48 in which is a spring-loaded piston 49 having a piston rod 50 which carries contact plates 51, 52 arranged to be moved between pairs of contacts 53, 54 and 53', 54' that determine which set of immersion heaters and which set of relays 26 etc. or 26' etc. shall be in action. Thus, when the steam reaches the predetermined pressure for which the regulating valve 43 is set, it is admitted by the regulating valve to impinge on the piston 49 and operate the contact plates 51, 52. The cylindrical chamber 48 is provided with an outlet passage 55 which is uncovered by the land 56 movable with the poppet valve 43 when the latter returns to its seating, thus permitting the spring 57 to return the contact plates 51, 52 to their original position.

The operation of the power plant is as follows:

Output from the electric generator 16, which drives its exciter 17 is fed to the first immersion heater 21 in the first boiler 20, and heats the water therein as long as the speed of the windmill 10 is within a predetermined range. If it rises above this range, the spindle 34 of the centrifugal switch 18 rises and tilts the first mercury switch 42, operating the solenoid of the relay 26 to bring the second immersion heater 22 into the circuit. Further increases in the speed of the windmill 10 and hence in the output of the electric generator 16, 17, result in the third and subsequent immersion heaters 23, 24, 25 being successively brought into the circuit, the boiler 20 being heated until the steam pressure therein has reached its required value. If the wind drops and the electric generator output falls, the appropriate number of relays 29, 28, 27, 26 operate to cut out their respective immersion heaters 25, 24, 23, 22. If, however, the force and duration of the wind are sufficient, when the steam pressure has attained a predetermined value the steam-operated changeover switch 30 is operated and the second or reserve boiler 20a is brought into operation, the immersion heaters of which are brought successively into operation similarly to the heaters of the first boiler 20.

It will be appreciated that as average meteorological conditions vary in different sites, the number and size of the immersion heaters, boilers, and other components may be selected to ensure that the maximum output obtainable from the electric generator may be converted into heat energy.

I claim:

1. A wind-driven power generating plant comprising, in combination, a wind driven rotor, an electrical generator driven by said rotor, two boilers, a plurality of immersion heaters in each boiler, said heaters being adapted to be fed by said generator, first relay means allocated to the heaters in one boiler, second relay means allocated in the heaters in the second boiler, centrifugal switch mechanism driven by said rotor and operative to control said relay means selectively to bring the heaters in either boiler into action, and a pressure operated switch responsive to the pressure in one boiler and connected to said generator, said immersion heaters, said relay means and said centrifugal switch automatically to initiate the heating of the second boiler and stop the heating of the first when the pressure in the latter has reached a predetermined value.

2. A wind-driven power generating plant comprising, in combination, a wind driven rotor, an electrical generator driven by said rotor, two boilers, a plurality of immersion heaters in each boiler, said heaters being adapted to be fed by said generator, relay means controlling said heaters, centrifugal switch mechanism driven by said rotor and operative to control said relay means selectively to bring the heaters in either boiler into action, and a pressure operated switch responsive to the pressure in one boiler and connected to select either the heaters in one boiler or those in the other for operation.

CHARLES RICHARD FAIREY.

REFERENCES CITED

The following references are of record in the file of this patent:

UNITED STATES PATENTS

| Number | Name | Date |
|---|---|---|
| 423,421 | Farrall | Mar. 18, 1890 |
| 549,664 | Yaryan | Nov. 12, 1895 |
| 569,754 | Gibboney | Oct. 20, 1896 |
| 909,120 | Rosenbaum et al. | Jan. 5, 1909 |
| 1,194,165 | Fry | Aug. 8, 1916 |
| 1,214,021 | Eaken | Jan. 30, 1917 |
| 1,257,801 | Burke | Feb. 26, 1918 |
| 1,779,549 | Lawaczeck | Oct. 28, 1930 |
| 1,821,265 | Lawaczeck | Sept. 1, 1931 |
| 1,824,960 | Lawaczeck | Sept. 29, 1931 |
| 2,036,613 | Stuart | Apr. 7, 1936 |
| 2,100,710 | Dendel | Nov. 10, 1937 |
| 2,187,202 | Henry | Jan. 16, 1940 |
| 2,252,788 | Sparr | Aug. 19, 1941 |
| 2,339,749 | Albers | Jan. 25, 1944 |
| 2,359,623 | Coxon | Oct. 3, 1944 |

FOREIGN PATENTS

| Number | Country | Date |
|---|---|---|
| 75,589 | Switzerland | Jan. 2, 1918 |
| 400,024 | Germany | Aug. 13, 1924 |
| 846,095 | France | May 27, 1939 |